US008694899B2

(12) United States Patent
Goossens et al.

(10) Patent No.: US 8,694,899 B2
(45) Date of Patent: Apr. 8, 2014

(54) AVATARS REFLECTING USER STATES

(75) Inventors: Thomas Goossens, Paris (FR); Laurent Baumann, Campbell, CA (US); Geoff Stahl, San Jose, CA (US)

(73) Assignee: Apple Inc., Cupertino, CA (US)

(*) Notice: Subject to any disclaimer, the term of this patent is extended or adjusted under 35 U.S.C. 154(b) by 41 days.

(21) Appl. No.: 12/791,643

(22) Filed: Jun. 1, 2010

(65) Prior Publication Data

US 2011/0296324 A1     Dec. 1, 2011

(51) Int. Cl.
*G06F 3/048* (2013.01)
*G06F 3/00* (2006.01)

(52) U.S. Cl.
USPC .......................... 715/763; 715/706; 715/708

(58) Field of Classification Search
USPC .......................................... 715/763, 706, 708
See application file for complete search history.

(56) References Cited

U.S. PATENT DOCUMENTS

| | | | |
|---|---|---|---|
| 6,453,294 B1 * | 9/2002 | Dutta et al. ................. | 704/270.1 |
| 7,386,799 B1 * | 6/2008 | Clanton et al. ................ | 715/758 |
| 7,484,176 B2 * | 1/2009 | Blattner et al. ............... | 715/758 |
| 7,603,413 B1 * | 10/2009 | Herold et al. ................ | 709/204 |
| 7,636,755 B2 * | 12/2009 | Blattner et al. ............... | 709/206 |
| 7,697,960 B2 | 4/2010 | Seo et al. | |
| 7,895,049 B2 * | 2/2011 | O'Sullivan et al. ............ | 705/1.1 |
| 7,908,554 B1 * | 3/2011 | Blattner ........................ | 715/706 |
| 7,979,574 B2 * | 7/2011 | Gillo et al. ................... | 709/238 |
| 8,026,918 B1 * | 9/2011 | Murphy ........................ | 345/473 |
| 8,037,147 B1 * | 10/2011 | Herold et al. ................ | 709/206 |
| 8,047,988 B2 * | 11/2011 | Lee et al. ..................... | 600/300 |
| 8,088,044 B2 * | 1/2012 | Tchao et al. ..................... | 482/8 |
| 8,250,144 B2 * | 8/2012 | Blattner et al. ............... | 709/204 |
| 8,384,719 B2 * | 2/2013 | Reville et al. ................. | 345/473 |
| 8,402,378 B2 * | 3/2013 | Blattner et al. ............... | 715/758 |
| 2003/0110450 A1 | 6/2003 | Sakai | |
| 2005/0078804 A1 | 4/2005 | Yomoda | |
| 2005/0143108 A1 | 6/2005 | Seo et al. | |
| 2005/0248574 A1 | 11/2005 | Ashtekar et al. | |
| 2007/0130001 A1 * | 6/2007 | Jung et al. ........................ | 705/14 |
| 2008/0163074 A1 | 7/2008 | Tu | |
| 2009/0147008 A1 | 6/2009 | Do et al. | |
| 2009/0150778 A1 * | 6/2009 | Nicol, II ....................... | 715/706 |

FOREIGN PATENT DOCUMENTS

KR    1020020042248 A    6/2002

OTHER PUBLICATIONS

Amin, Alia K., et al., "The Sense MS: Enriching the SMS experience for Teens by Non-verbal Means", *Human-Computer Interaction—INTERACT 2005*, IFIP TC13 International Conference Proceedings, Rome, Italy, Sep. 12-16, 2005, pp. 962-965.

* cited by examiner

*Primary Examiner* — David Phantana Angkool
(74) *Attorney, Agent, or Firm* — Wong, Cabello, Lutsch, Rutherford & Brucculeri, LLP

(57) ABSTRACT

Methods, systems, and computer-readable media for creating and using customized avatar instances to reflect current user states are disclosed. In various implementations, the user states can be defined using trigger events based on user-entered textual data, emoticons, or states of the device being used. For each user state, a customized avatar instance having a facial expression, body language, accessories, clothing items, and/or a presentation scheme reflective of the user state can be generated. When one or more trigger events indicating occurrence of a particular user state are detected on the device, the avatar presented on the device is updated with the customized avatar instance associated with the particular user state.

18 Claims, 12 Drawing Sheets

400

Receiving the second user input on a facial feature of the preset avatar instance, the second user input adjusting at least one of a location, shape, or size of the facial feature
402

Generating the customized avatar instance based on the adjusted facial feature
404

Receiving the second input on the facial expression of the preset avatar instance, the second user input adjusting an emotional intensity level associated with the facial expression
412

Generating the customized avatar instance based on the facial expression having the adjusted emotional intensity level
414

```
Receiving second user input for generating a customized avatar instance for
the user state, the second user input adjusting a presentation scheme for a
preset avatar instance associated with the user state, the presentation scheme
include at least one of a background image, a background sound effect, or an
animation effect accompanying the presentation of the avatar in a user
interface                                                              442
```

↓

```
Associating the customized avatar instance with the user state    454
```

```
Receiving second user input defining the user state, the second user input
specifying the one or more trigger events that indicate presence of the user
state                                                              502
```

↓

```
Receiving third user input for generating a customized avatar instance for the
user state                                                         504
```

↓

```
Associating the customized avatar instance with the user-defined user state
                                                                   506
```

FIG. 5

```
                    ┌─────────────────────────────────────────────────────────┐
                    │ Receiving first user input defining a user state by one or more trigger events │
                    │                                                     802 │
                    └─────────────────────────────────────────────────────────┘
                                              │
                                              ▼
                    ┌─────────────────────────────────────────────────────────┐
                    │ Receiving second user input specifying a customized avatar instance to │
                    │ represent the user state, the customized avatar instance showing a user-defined │
                    │ facial expression on a personalized avatar associated with the user  804 │
                    └─────────────────────────────────────────────────────────┘
                                              │
                                              ▼
                    ┌─────────────────────────────────────────────────────────┐
                    │ Associating the customized avatar instance with the user-defined user state │
                    │                                                     806 │
                    └─────────────────────────────────────────────────────────┘
                                              │
                                              ▼
                    ┌─────────────────────────────────────────────────────────┐
                    │ Detecting occurrence of the one or more trigger events on a device │
                    │                                                     808 │
                    └─────────────────────────────────────────────────────────┘
                                              │
                                              ▼
                    ┌─────────────────────────────────────────────────────────┐
                    │ Updating a current instance of the personalized avatar presented on a user │
                    │ interface of the device with the customized avatar instance associated with the │
                    │ user state                                          810 │
                    └─────────────────────────────────────────────────────────┘
```

FIG. 8

AVATARS REFLECTING USER STATES

TECHNICAL FIELD

This disclosure relates generally to providing user state information on computers and other devices.

BACKGROUND

Avatars are increasingly used in online social networking, gaming, and other communications, typically as a surrogate for an actual photograph of the user. Avatars offer a measure of privacy, while allowing the users to have control over their online identities. As a means for self-expression, many users customize their own avatars to show physical characteristics that reflect the actual appearances of the users. The users can also dress up their avatars with accessories and clothing items that reflect the users' individual styles and fashion tastes.

When a user interacts with others in various communication contexts (e.g., in online chat sessions, emails, etc), the user can sometimes enter textual strings or preset emotional icons ("emoticons") in a text message to reflect his or her current emotional state (e.g., happy, angry, sad, etc.) to other users. These emoticons help improve the interpretation of the plain text of the message.

SUMMARY

A method for creating and using avatars to reflect user states is disclosed. The method allows individual users to associate individualized avatar expressions and/or body language with trigger events for user states that are associated with particular emotions detected on the user's device. The trigger events indicating presence of a particular user state can be a status indicator explicitly set by the user, special textual patterns included of messages sent by the user, a manner with which the user is interacting with the device, or a particular state of the device used by the user. When an avatar of a user is presented on the user interface of a device, the avatar's expressions and/or body language are changed according to the user states that are detected on the device based on occurrences of these different trigger events.

In general, one innovative aspect of the subject matter described in this specification can be embodied in methods that include the actions of: receiving first user input associating a user state with an instance of an avatar representing a user, the instance of the avatar having a facial expression representative of the user state; detecting occurrence of one or more trigger events on a device, the one or more trigger events indicating presence of the user state; and updating a current instance of the avatar presented on a user interface of the device with the instance of the avatar associated with the user state.

Other embodiments of this aspect include corresponding systems, apparatus, and computer programs, configured to perform the actions of the methods, encoded on computer storage devices.

These and other embodiments can each optionally include one or more of the following features.

In some implementations, the user state is one of a plurality of preset user states. The action of receiving the first user input associating the user state with the instance of the avatar further include the actions of presenting the plurality of preset user states, each of the preset user states is associated with a respective preset avatar instance having a respective facial expression representative of the preset user state. For each of the plurality of preset user states, the actions further include the actions of receiving respective second user input for generating a customized avatar instance for the preset user state, the respective second user input adjusting the facial expression shown on the preset avatar instance associated with the preset user state; and associating the customized avatar instance with the preset user state.

In some implementations, the action of receiving the respective second user input for generating a customized avatar instance for the preset user state further includes the actions of receiving the second user input on a facial feature of the preset avatar instance, the second user input adjusting at least one of a location, shape, or size of the facial feature; and generating the customized avatar instance based on the adjusted facial feature.

In some implementations, the action of receiving the respective second user input for generating a customized avatar instance for the preset user state further includes receiving the second input on the facial expression of the preset avatar instance, the second user input adjusting an emotional intensity level associated with the facial expression; and generating the customized avatar instance based on the facial expression having the adjusted emotional intensity level.

In some implementations, the method further includes the actions of creating and storing a user state definition for the user state based on the first user input, the user state definition specifying the one or more trigger events indicating presence of the user state and referencing the instance of the avatar associated with the user state.

In some implementations, the user state is one of a plurality of preset user states, and the action of receiving the first user input associating the user state with the instance of the avatar further includes presenting a plurality of preset avatar instances having respective facial expressions representative of the preset user state, wherein the preset avatar instances have been generated based on common characteristics of a plurality of customized avatar instances associated with the preset user state by a plurality of other users; and receiving the first user input selecting one of the plurality of preset avatar instances as the avatar instance for the user state.

In some implementations, the action of receiving the first user input associating the user state with the instance of the avatar further includes receiving second user input for generating a customized avatar instance for the user state, the second user input adjusting a facial expression shown on a preset avatar instance associated with the user state and at least one of accessories and clothing items on the preset avatar instance; and associating the customized avatar instance with the user state.

In some implementations, the action of receiving the first user input associating the user state with the instance of the avatar further includes receiving second user input for generating a customized avatar instance for the user state, the second user input adjusting a presentation scheme for a preset avatar instance associated with the user state, the presentation scheme include at least one of a background image, a background sound effect, or an animation effect accompanying the presentation of the avatar in a user interface; and associating the customized avatar instance with the user state.

In some implementations, the user state is user-defined, and the action of receiving the first user input associating the user state with the instance of the avatar further includes receiving second user input defining the user state, the second user input specifying the one or more trigger events that indicate presence of the user state; receiving third user input for generating a customized avatar instance for the user state; and associating the customized avatar instance with the user-defined user state.

In some implementations, the user state is defined by a textual string, the textual string being one of a word, a phrase, an emoticon, a punctuation, or a text format that conveys an emotional connotation associated with the user state, and detecting the occurrence of the one or more trigger events on the device further includes detecting occurrences of the textual string in a textual message sent from the device.

In some implementations, the user state is defined by a predetermined time associated with a special occasion, and detecting the occurrence of the one or more events on the device further includes detecting arrival of the predetermined time on the device.

In some implementations, the user state is defined by a manner in which the user is interacting with the device, the manner of interaction includes at least one of a speed, frequency, and outcome of the interaction, and detecting the occurrence of the one or more trigger events on the device further includes detecting that inputs are being received from the user in the manner that defines the user state.

In some implementations, the user state is defined by a state of the device, the state of the device includes at least one of a type of the device, a power level of the device, and a bandwidth of the device, and detecting the occurrence of the one or more trigger events on the device further includes detecting a match between a current state of the device and the device state that defines the user state.

In some implementations, updating the current instance of the avatar presented on the user interface of the device with the instance of the avatar associated with the user state further includes determining that the avatar is currently presented on the user interface and that the avatar instance that is currently presented differs from the instance of the avatar associated with the user state; and replacing the avatar instance currently presented with the avatar instance associated with the user state.

In some implementations, replacing the avatar instance further includes providing intermediate instances of the avatar on the user interface to show a smooth transition from the current avatar instance to the updated avatar instance.

In some implementations, the transition from the current avatar to the updated avatar instance occurs at a speed that is dependent on the user state.

In general, one innovative aspect of the subject matter described in this specification can be embodied in methods that include the actions of: receiving first user input defining a user state by one or more trigger events; receiving second user input specifying a customized avatar instance to represent the user state, the customized avatar instance showing a user-defined facial expression on a personalized avatar associated with the user; associating the customized avatar instance with the user-defined user state; detecting occurrence of the one or more trigger events on a device; and updating a current instance of the personalized avatar presented on a user interface of the device with the customized avatar instance associated with the user state.

Particular embodiments of the subject matter described in this specification can be implemented to realize one or more of the following advantages.

For example, conventional avatars and emoticons are often static and generic. Even though users are allowed customize the appearances of their avatars to a certain degree, the users have to rely on preset emoticons or canned avatar faces other than their own individualized avatars to express the emotional connotations in their text messages and communications. The subtle differences in how each individual expresses his or her emotions could not be captured by these preset emoticons and canned avatar faces.

By allowing individual users to associate individualized avatar expressions and/or body language with particular user states, the users are given the means to communicate with others in a more accurate and expressive way. When users are allowed to create and use avatar instances having individualized expressions and/or body language for each user state, the users can enjoy more creativity and fun in the self-expression and the interactions with other users.

In addition, users are allowed to define their own trigger events for different existing user states and create new user states. For example, in addition to preexisting emoticons, the users can create their own emoticons as trigger events for a particular user state that has special meaning to only a small group of friends, and create an avatar instance expressing the special meaning Therefore, user states that are unique to an individual user or a group of associated users having common interests and experiences can be created. These user-defined user states facilitate better communication among users and invoke more creativity and fun during the communication.

The details of one or more implementations of the methods, systems, and computer-readable media are set forth in the accompanying drawings and the description below. Other features, aspects, and advantages of the subject matter will become apparent from the description, the drawings, and the claims.

BRIEF DESCRIPTION OF THE DRAWINGS

FIGS. 4A-4E are flow diagrams of exemplary processes for customizing an avatar instance for a preset user state.

FIG. 5 is a flow diagram of an exemplary process for defining a user state and creating a customized avatar instance for the user state.

FIG. 8 is a flow diagram of another exemplary process for using customized avatar expressions to reflect user-defined user states.

Like reference symbols in the various drawings indicate like elements.

DETAILED DESCRIPTION

Overview of Using Customized Avatar Instances to Reflect User States

An avatar is a representation of a user or their alter ego in a virtual environment. An avatar is often in the form of a threedimensional (3D) model used in computer games or a two-dimensional (2D) icon or picture used on Internet forums, social networks and other online communities. Avatars can also be used in online interactive gaming environments.

Each user can construct an individualized avatar to associate with his or her virtual identity, for example, through an avatar editing environment. The user can select and modify the facial features, hairstyles, skin tones, clothes, accessories, etc. (collectively referred to as "elements") for his or her avatar and also specify colors for each of the avatar elements. Once the user has specified various aspects of his or her individual avatar, the avatar definition data can be stored and recalled for rendering the avatar in various virtual environments, such as in online chat sessions, internet forums, personal blogs, interactive games, address books, calendars, and so on.

An individualized avatar can resemble the user that it represents in terms of appearance and fashion. However, in conventional systems, each user's avatar is often static and does not have the rich facial expressions and body language that a real person may have under different situations. Although users can use words or insert emoticons in their messages to convey the emotional connotations associated with the messages, the word and emoticons are generic character strings or generic symbols that do not reflect the individuality in each user's expression of the emotions.

In the method and systems described in this specification, each individual user is given an opportunity to create instances of the user's individual avatar, where each instance of the avatar has a facial expression and/or body language that reflect a particular emotion of the user. The particular emotion can be defined by the user as a user state. When trigger events indicating the particular emotion are detected on a device associated with the user at a particular moment, the avatar instance associated with that emotion can be used to represent the user at that moment.

Figure 1:
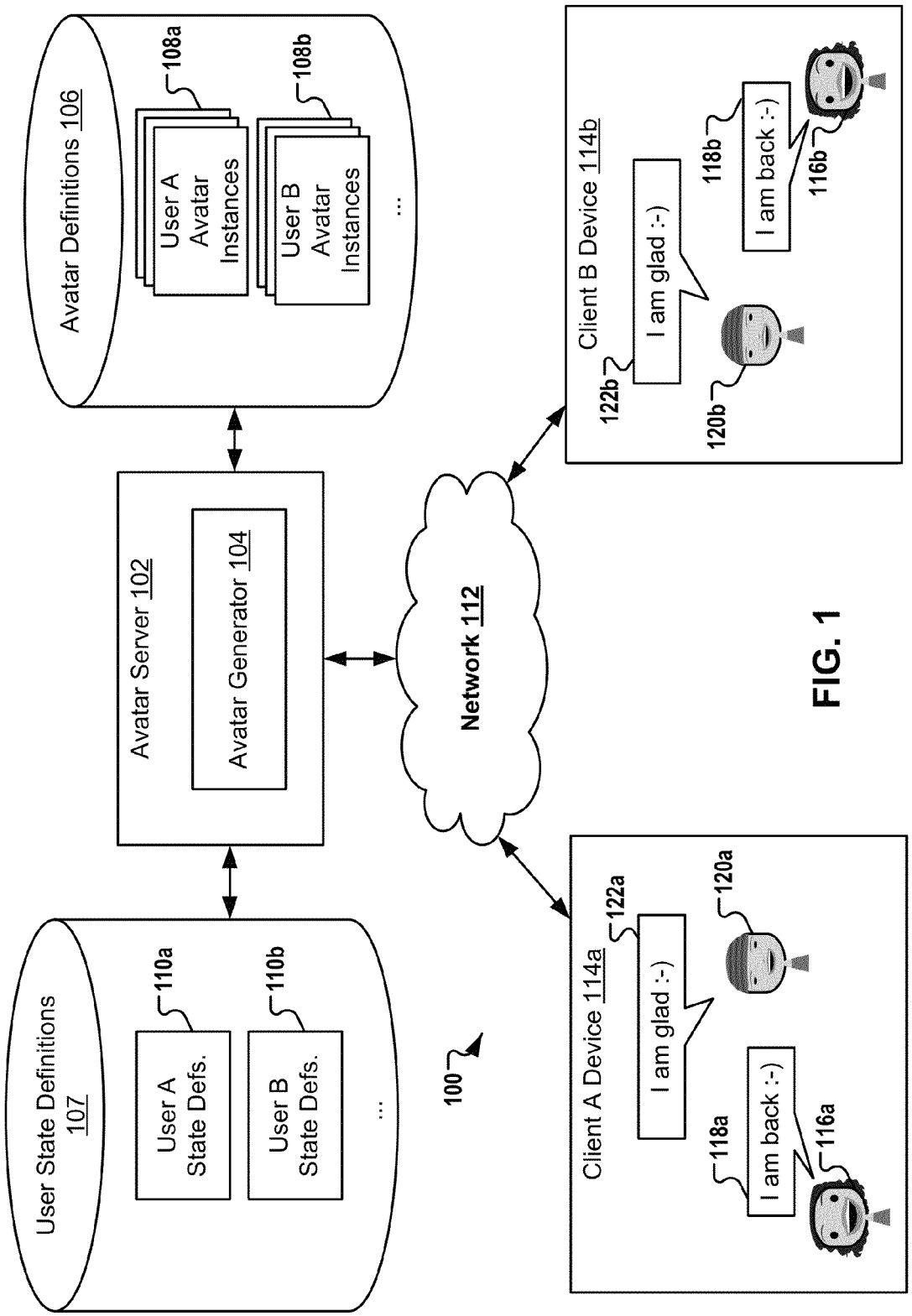
FIG. 1 is a block diagram of an exemplary system for using customized avatar instances associated with different users to reflect the current user states of each user.

FIG. 1 is an exemplary avatar operating environment 100, where users can create and customize their individualized avatars to represent themselves in various virtual environments. The users can also define different user states and create different instances of their individual avatars to express the emotion associated with each user state.

In the example avatar operating environment 100, an avatar server 102 communicates with one or more user client devices 114 through one or more networks 112. Each user client device 114 is associated with a respective user. For example, user client device 114a (client device A) is associated with user A and user client device 114b (client device B) is associated with another user B. User A and user B can communicate through various application programs installed on the client devices 114, such as a chat application, or an online interactive game application. The communications can be made through the network 112 and facilitated by the avatar server 102.

In some implementations, the avatar server 102 can provide an avatar editing environment in which each user creates his or her own individualized avatar. An example avatar editing environment is disclosed in co-pending U.S. Provisional Patent Application No. 61/321,840, for "Avatar Editing Environment," filed Apr. 7, 2010, which is incorporated by reference herein in its entirety.

When a user has created his or her avatar, the definition data for the avatar can be stored in an avatar definition database 106 where it is associated with the user. When the avatar is subsequently used to represent the user in various context (e.g., in games, chat sessions, etc.), the avatar definition associated with the user can be retrieved and used to render the avatar in the various contexts. In some implementations, the avatar server 102 includes an avatar generator component 104. The avatar generator component 104 can provide the interface for avatar creation. The avatar generator component 104 can also retrieve and provide the avatar definition to appropriate devices for rendering the avatar in the various contexts.

In some implementations, the avatar server 102 can also provide a user state definition interface, for example, within the avatar editing environment. Each user can provide their own definitions for various user states, and create instances of their own avatar to express the user's emotions associated with each user state.

In some implementations, the definition of a user state can include for example, a user state identifier or name, one or more trigger events that indicate the presence of the user state. The definition of each user state also specifies an avatar instance that is to be used to represent the user when the trigger events indicating the user state are detected on the user's device. Once the user has defined his or her set of user states and the associated avatar instances, user state definitions 110 defining the user states can be stored in a user state definition database 107. Each user state definition associated with the user can reference a corresponding avatar instance that is stored in the avatar definition database 106.

As an example, the definition of a user state can include a name or identifier for the user state. A keyword, such as "Happiness," "Surprise," "Joking," and so on, can be used as the name or identifier of a user state that is associated with the emotion indicated by the keyword. The name or identifier can also be an emoticon entered by a user.

The definition of the user state can further include the trigger events that indicate the presence of the user state. The trigger events can be a particular keyword (e.g., "WOW"), a particular emoticon (e.g., ":-)"), a particular outcome of a game action (e.g., winning a game, a high score, etc.), a particular date or time (e.g., weekend, birthday, etc.), and so on, that are likely to elicit a particular emotional response from the user or indicate the presence of the particular emotional response in the user. In some implementations, the name or identifier for the user state can be automatically generated based on the trigger events specified for the user state.

Once the trigger events for a user state are specified, the user can create and associate a particular avatar instance with the user state. The avatar instance created by the user would have the facial expressions, body language, and/or presentation theme, that the user wishes to use to represent the emotion that the user himself is likely to have upon occurrence of those trigger events. For example, if the trigger event is a keyword "WOW," the user may create an avatar instance based on his own individualized avatar that has a facial expression of amazement and excitation in a degree that is in line with how the user himself may express this emotion.

In some implementations, a default set of user states can be provided by the avatar server 102 to each user. For example, some basic emotions and associated trigger events (e.g., common emoticons) can be provided in the default set, and each user can add or delete the user states as the user wishes. A default set of avatar instances can also be provided for each preset user state. Each avatar instance can be based on a modification of the basic individualized avatar of the user using heuristics derived from people's facial expressions for different emotions. The default set of avatar instances can be fine-tuned by each user so that they more accurately reflect the subtle differences in how each user would express the same emotion.

In a simplified example shown in FIG. 1, user A of client device 114a is engaged in an online chat with user B of client device 114b. User A has an individualized avatar 116 in the appearance of a teenage girl, while user B has an individualized avatar 120 in the appearance of a teenage boy. During a chat, user A entered a text message "I am back :-)" as shown in the dialog bubble 118, and user B replied with a text message "I am glad :-)" as shown in the dialog bubble 122.

Suppose that both users have defined the same user state (e.g., "Happiness") that is triggered by the emoticon ":-)" in a text message. If user A is an extraverted person and user B is an introverted person, user A is likely to have a more exaggerated facial expression than user B when they both feel the same emotion as expressed by the emoticon ":-)". To have their individual avatars more accurately reflect their emotions, user A can create an avatar instance that shows more excitement with a smile (e.g., with enlarged eyes, raised eye brows, and wide open mouth). In addition, the avatar may also be animated to wave its arms, and be accompanied by cheerful music. In contrast, user B can create an avatar instance that shows a more subdued expression, such as a light smile, with little change to the eyes and brows. The two avatar instances are stored in the avatar definition database 106 in association with their respective users, and are referenced by the user state definition triggered by the emoticon ":-)".

When the emoticon ":-)" is detected in user A's text message, the avatar instance 116 associated with the user state "Happiness" is retrieved from the avatar definition database 106 and displayed on both users' devices 114 as a representation of user A. When the emoticon ":-)" is detected in user B's text message, the avatar instance 120 associated with the user state "Happiness" is retrieved from the avatar definition database 106 and displayed on both users' devices as a representation of user B.

Example Processes for Using Customized Avatar Instances to Reflect User States

Figure 2:
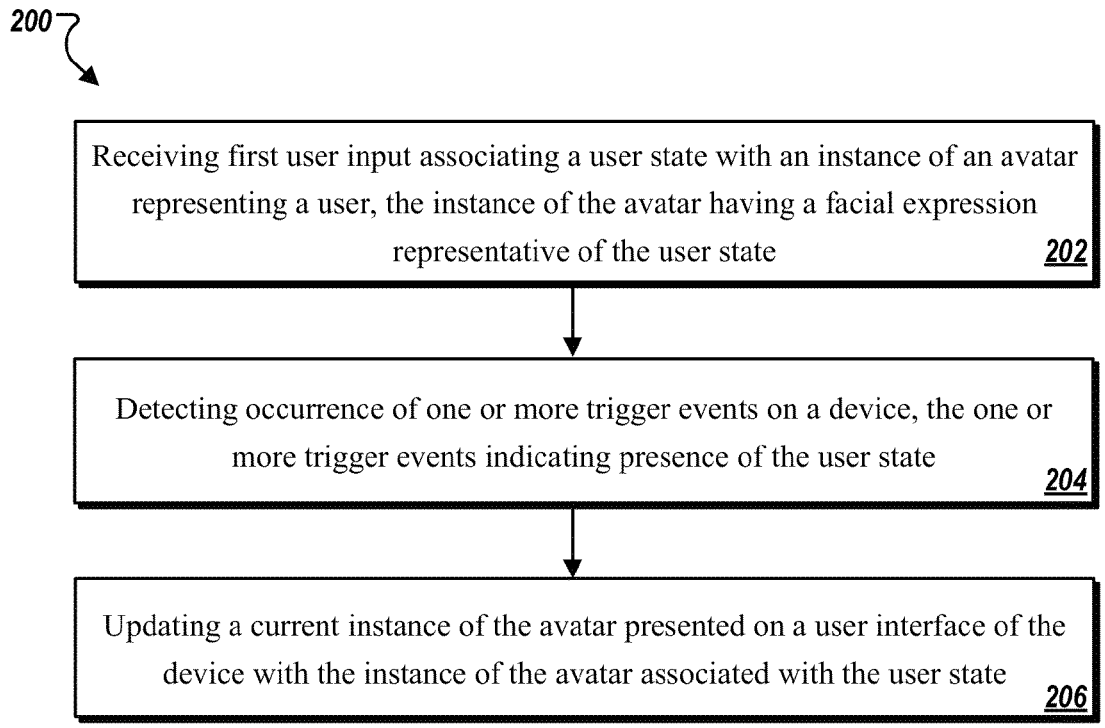
FIG. 2 is a flow diagram of an exemplary process for using customized avatar expressions to reflect user states.

FIG. 2 is a flow diagram of an exemplary process 200 for using customized avatar instances to reflect user states. The process 200 can be implemented in the avatar operating environment 100, for example. The process 200 can be performed by the avatar server 102, for example. In some implementations, the process 200 can also be performed on a user client device that retrieves avatar data from the avatar server.

In the example process 200, first user input is received, where the first user input associates a user state with an instance of an avatar representing a user, and the instance of the avatar has a facial expression representative of the user state (202). The association between a user state and a corresponding avatar instance is user-specific and can be created during an avatar editing stage through an avatar editing environment. The avatar editing environment can be provided by an avatar server to a client device associated with the user.

In some implementations, the avatar representing the user can be an individualized avatar that has human facial features (e.g., eyes, nose, mustache, brows, mouth, face shape, skin tone, etc.), clothing (e.g., shirt, pants, shoes, etc.), and accessories (e.g., hat, scarf, jewelry, glasses, etc.) that are specified by the user and that reflect the user's appearance and fashion preferences. The individualized avatar can also be associated with a presentation theme that includes a background image, a background sound effect, and/or animation effects that accompany the avatar when the avatar is presented on a user interface.

The process 200 continues when an occurrence of one or more trigger events are detected on a device, where the one or more trigger events indicate the presence of the user state (204). The one or more trigger events can be specified in the definition of the user state. After the user state is defined and an avatar instance is associated with the user state, the avatar server can monitor the user's device to determine whether the trigger events associated with the user state are present on the user's device. For example, if the trigger events for the user state were the occurrence of a particular emoticon in the text messages sent from the user's device, the avatar server would detect such occurrence and determine that the user state associated with the trigger events is present.

In some implementations, more than one trigger events can be used to define a user state, and occurrence of any one of the trigger events can be used to indicate the presence of the user state. For example, the user state "Happiness" can be defined by an emoticon ":-)," a keyword "happy," or a winning outcome of a game, and any of the three trigger events can be used to detect the presence of the user state. In some implementations, simultaneous occurrence of multiple trigger events can be used to detect the presence of a user state. For example, the user state "Angry" can be defined by the simultaneous occurrence of two trigger events: (1) an emoticon ":-(" in a text message and (2) all text are capitalized in the message.

Once the trigger events associated with the user state is detected on a user's device, the avatar presented on a user interface of the device can be updated with the instance of the avatar associated with the user state (206). For example, when the user inserts an emoticon ":-)" in a text message sent to another user, the user's avatar appearing in the chat session between the two users can be updated to show the avatar instance associated with the "Happiness" user state. In some implementations, the avatar server can monitor the current user state of a user and forward data associated with the avatar instance to client devices in communication with the user's device, such that the avatar instance showing the current state of the user is displayed on each of the client devices in communication with the user's device.

In some implementations, if new user states are not subsequently detected, the avatar instance shown on the user interface is changed back to a default or neutral avatar instance after a predetermined period of time.

Figure 3:
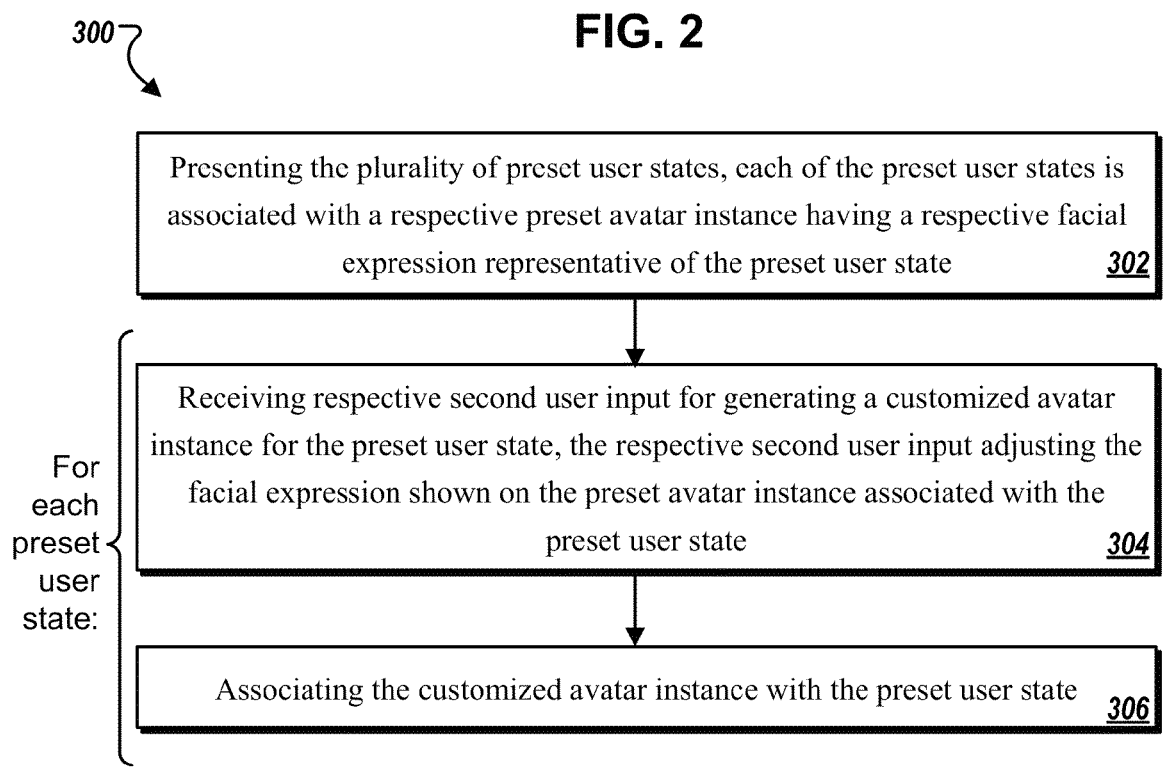
FIG. 3 is a flow diagram of an exemplary process for customizing an avatar instance for a user state.

FIG. 3 is a flow diagram of an exemplary process 300 for customizing an avatar instance for a user state. In some implementations, the avatar server can provide a number of preset user states that are common among many users. A preset user state can be a user emotion, such as "Happy," "Surprised," or "Angry." The trigger events for these preset user states can be commonly defined for a large number of users. For example, the emoticon ":-)" can be a default trigger event for a present "Happy" user state for all users.

To have a user associating a customized avatar instance with a preset user state, the avatar server can present a number of preset user states for user review and selection. The avatar server can also present a respective preset avatar instance for each of the present user state, where each preset avatar instance has a facial expression representative of the preset user state (302). In some implementations, the preset avatar instance is generated based on basic heuristics of human expressions and the basic individualized avatar created by the user.

For each of the preset user states presented to the user, a respective user input is received from the user for generating a customized avatar instance for the preset user state (304). The user input for each preset user state can adjust the facial expression shown on the preset avatar instance associated with the preset user state. After the customized avatar instance is created, the customized avatar instance can be associated with the preset user state (306).

By allowing the user to adjust the facial expression of a basic avatar that user has created to represent him or herself, instances of the same avatar showing different emotions can be created. The user has control over how to express a particular emotion associated with a user state, and can fine-tune the facial expression of the avatar instance to reflect the user's individuality. In some implementations, the user may specify additional changes to the preset avatar to express the emotion associated with the user state.

For example, in some implementations, in addition to adjusting the facial expression of the preset avatar, the user can also adjust the clothing and accessories on the avatar. For example, for a user state "Angry," the avatar instance can be dressed in red, while for a user state "Calm," the avatar instance can be dressed in white.

For another example, in some implementations, the user can design an animation for the avatar instance to indicate the body language that the user may have for a user state. For example, the avatar instance associated with the "Bored" user state may include an animation showing the avatar yarning from time to time, while the avatar instance associated with the "Excited" user state may include an animation showing the avatar jumping up and down.

For another example, in some implementations, the user can specify or modify a presentation theme for the avatar instance. The presentation theme is a background image, background music, and/or a sound or animation effect that accompany that the presentation of the avatar instance. For example, for a "Happy" user state, cheerful music can be played when the avatar instance for the "Happy" user state is displayed, while for a "Sad" user state, melancholic music can be played when the avatar instance for the "Sad" user state is displayed.

FIGS. 4A-4E are flow diagrams of exemplary processes for customizing an avatar instance for a preset user state. Once the customized avatar instance is generated, it is stored in the avatar definition database in association with the user and the associated user state.

In a process 400 shown in FIG. 4A, a customized avatar instance can be generated for a preset user state by the user adjusting the facial feature(s) shown on a preset avatar instance (e.g., a default avatar created by the user). The process 400 can start when user input is received on a facial feature of the preset avatar instance, where the user input adjusts at least one of a location, shape, and size of the facial feature (402).

For example, the avatar editing environment can provide the preset avatar instance on a user interface of the user's device, and the user can adjust the locations, shapes, and/or sizes of various facial features on the preset avatar instance. For example, the user can enlarge the eyes, move the eyebrows up and away from the eyes, and open the mouth of the preset avatar instance to show a surprised expression.

Different users can adjust the expression of the default avatar instance differently for the same user state to reflect their individual reactions under the same user state. After the user input adjusting the facial feature of the preset avatar instance is received, the customized avatar instance is generated using the adjusted facial feature (404).

In a process 410 shown in FIG. 4B, a customized avatar instance is generated for a preset user state by the user adjusting an intensity level associated with the facial expression of the preset avatar instance. The process 410 can start when the user input is received on the facial expression of the preset avatar instance, the user input adjusting an emotional intensity level associated with the facial expression (412).

In some implementations, the preset avatar instance has an expression that is generated based on basic heuristics of human expressions for different emotions. The avatar server can provide the preset avatar instance along with a slider that is used to control the intensity of the emotion that is to be expressed by the avatar instance. For example, for a "Happy" user state, the preset avatar instance can show an expression that is of medium intensity. An extraverted person may adjust the slider to increase the intensity of the expression shown on the preset avatar instance such that the expression on the preset avatar instance becomes more exaggerated and obvious. Once the user is satisfied with the precise degree of emotion that is being expressed on the avatar instance, the customization of the avatar instance for the user state is completed, and the customized avatar instance can be generated using the facial expression having the adjusted emotional intensity level (414).

Figure 4C:
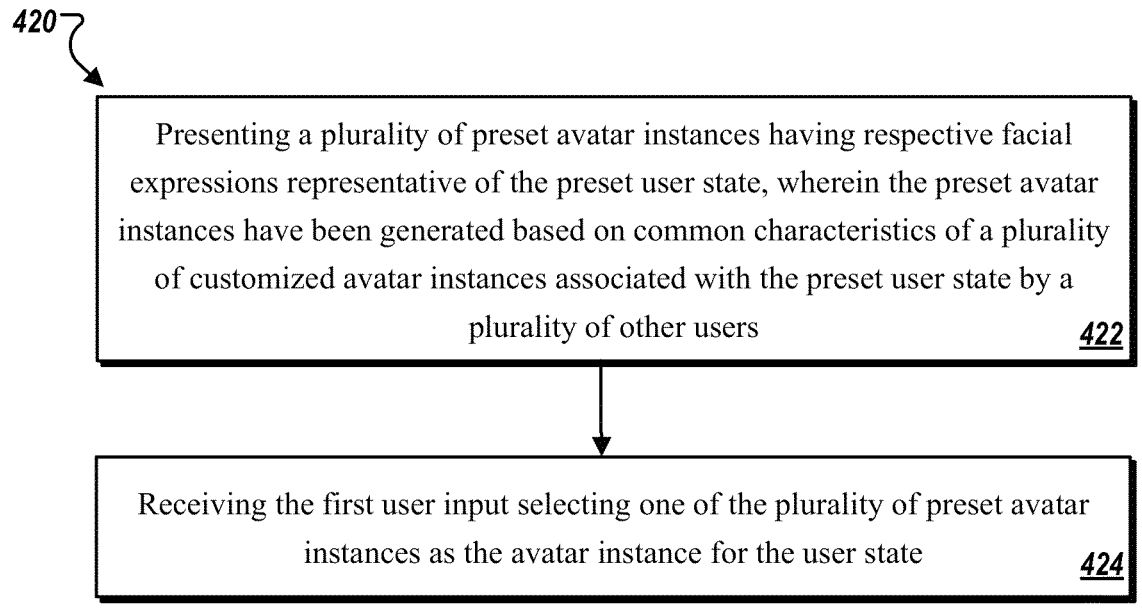

In a process 420 shown in FIG. 4C, a customized avatar instance is generated for a preset user state based on a user selection from a number of suggested avatar instances. The suggested avatar instances can be generated based on customized avatar instances that have been associated with the same preset user state by a plurality of other users. The process 420 starts when the avatar server presents a plurality of preset avatar instances having respective facial expressions representative of the preset user state (422). Then, user input selecting one of the preset avatar instances as the avatar instance for the user state can be received (424).

In some implementations, the avatar server 102 can generate these preset avatar instances based on the user's individual avatar and common characteristics of facial expressions shown on the customized avatar instances of other users that are associated with the same preset user state. For example, if many users' customized avatar instances associated with the preset user state "Bored" showing tears streaming down the cheek of the avatar instances, the avatar server 102 can identify the tears as a common characteristic for the facial expression for the "Bored" user state. The avatar server 102 can generate a suggested preset avatar instance based on the current user's individual avatar and add the tears to the avatar. Other common characteristics for the "Bored" user states may include sagging facial muscles, droopy and half-closed eyes, yarning mouth, and so on. More than one preset avatar instance for the user state can be generated and presented to the user, and the user can select one preset avatar instance that most closely resemble the user's own expression of boredom to associate with the "Bored" user state.

Figure 4D:
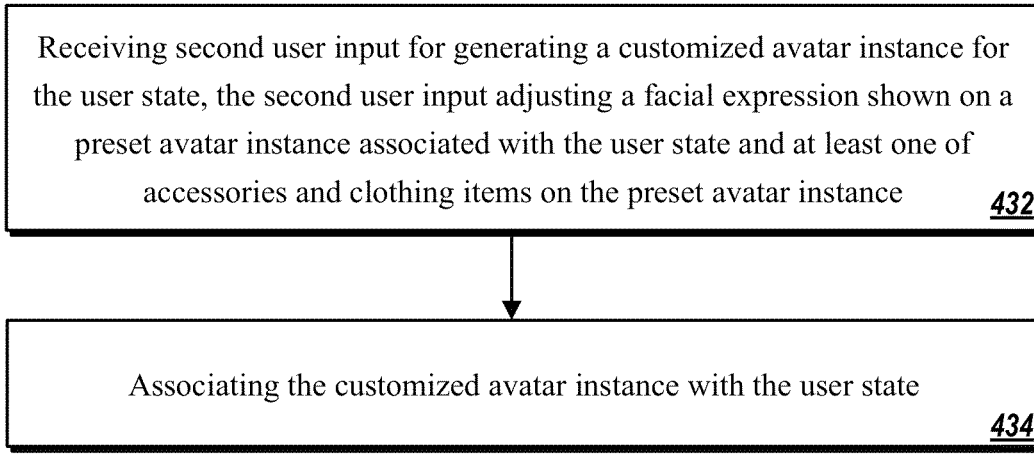

In a process 430 shown in FIG. 4D, a customized avatar instance for a preset user state can include customized facial expression as well as customized accessories and clothing items. For example, a user state "Birthday" can be created, and the customized avatar instance for the user state "Birthday" can be generated using the user's default avatar as a basis and adding a happy facial expression, a party hat, and a party shirt showing balloons.

In the process 430, a user input for generating a customized avatar instance for the user state is received, where the user input adjusts the facial expression shown on a preset avatar instance associated with the user state and at least one of accessories and clothing items on the preset avatar instance (432). After the user has created the customized avatar instance for the user state, the customized avatar instance can be associated with the user state (434). The association between the customized avatar instance and the user state can be stored for the user in the user state definition database 107 on the avatar server 102, for example.

In some implementations, a customized avatar instance for a preset user state can include customized facial expression as well as a customized presentation theme. In a process 440 shown in FIG. 4E, a user input for generating a customized avatar instance for the user state is received, where the user input adjusts a presentation scheme for a preset avatar instance associated with the user state (442).

A presentation scheme associated with an avatar instance can include a background image, a background sound effect, and/or an animation effect accompanying the presentation of the avatar instance in a user interface. For example, an avatar instance for the "Bored" user state can be associated with a "snoring sound." Every time the avatar instance for the "Bored" user state is presented, the snoring sound can be played. For another example, a "Birthday" user state can be associated with a background showing balloons and animated fireworks effects. Once the customized avatar is generated based on the user input, the customized avatar instance can be associated with the user state (444).

In some implementations, multiple processes for creating a customized avatar instance for a user state can be used in combination. The avatar server can provide an interface that allows the user to select which customization technique(s) to use for each user state. In some implementations, the avatar server can provide a suggested customization method based on statistical analysis of preferences of a large number of users.

In some implementations, the preset user states can be defined based on accepted usage of emoticons and keywords that express emotions. Common emoticons include ":-)" for happiness, ":-D" for laugh, ":-(" for sadness, ":-/" for skepticism, and so on. Common usage of keywords includes "am happy" for happiness, "WOW" for excitement, "LOL" for laughing aloud, and so on.

In some implementations, instead of only customizing the avatar instances for the preset user states provided by the avatar server, each user can also modify the definition of preset user states and/or create new individualized user states. The definition of a user state can include a name of the user state, the trigger events that are used to detect occurrence of the user state, and the avatar instance that is associated with the user state.

FIG. 5 is a flow diagram of an example process 500 for creating a user-defined user state and associating a customized avatar instance with the user-defined user state. In the process 500, user input defining the user state is received, where the user input specifies the one or more trigger events that indicate the presence of the user state (502). Then, user input for generating a customized avatar instance for the user state is received (504). The customized avatar instance is then associated with the user-defined user state (506).

There are many types of trigger events that a user can use define a user state. In some implementations, the user state can be defined by a textual string, the textual string being one of a word, a phrase, an emoticon, a punctuation, and a text format that conveys an emotional connotation of the text in which the textual string appears.

The user can enter the word, phrase, emoticon, punctuation, or text format as the trigger events in the user state definition interface provided by the avatar server. For example, for a "Happy" user state, the user can enter a keyword or phrase such as "am glad" and "am happy," and an emoticon ":-)" or ":)" as the trigger events. For a "Surprised" user state, the user can enter a phrase "am shocked," an emoticon ":-o", a punctuation combination "?!", and/or a text format of "ALL CAPS" as the trigger events for the user state.

Detection of the occurrence of the trigger events on the user's device includes detecting occurrences of the textual string in a textual message sent or received on the device. For example, if the user has defined the "Surprised" user state as having a trigger event of an emoticon ":-o", when the user inserts this emoticon in a text message sent through the avatar server (e.g., avatar server 102), the avatar instance associated with the "Surprised" user state as specified in the user's user state definition would be shown on the user interface of the user and other users receiving the message.

In some implementations, the user state can be defined by a predetermined time associated with a special occasion. For example, a birthday of the user, a special holiday, an anniversary, a graduation day, a vacation day, a weekend, an examination day, and so on, can be used to define different user states.

An avatar instance can be associated with the user state defined by the predetermined time for the special occasion. For example, the avatar instance associated with the "graduation day" user state can wear a graduation cap, holding a diploma, and showing a happy smile. For another example, the avatar instance associated with the "examination day" user state can show an intense and focused expression, holding a pen and a stack of textbooks.

The user can define the user state by entering a particular time period associated with a special occasion in the user state definition interface. The user can then generate a customized avatar instance for the user state that would have the facial expression, accessories, clothing, and/or presentation theme that the user wishes to use to represent his or her own state on the special occasion. The occurrence of the user state can be detected on a user's device based on the arrival of the predetermined time on the device.

In some implementations, the user state can be defined by a manner in which the user is interacting with the device. The manner of interaction can include the speed, the frequency, and/or the outcome of the user's interaction with the device, for example.

The user can specify the trigger events as a speed that the user is typing on the device, or invoking some input/output device (e.g., a mouse button, a controller, a touch-sensitive display, and so on). For example, a typing speed of 10 words per minute or less can be used to define a "Contemplative" user state. A typing speed of 60 words per minute or more can be used to define an "Engaged or Focused" user state, for example.

The user can also specify the trigger events based on the frequency that a particular application is used or a particular action is taken on the device. For example, a "Busy" user state can be defined as the user accessing documents on the device at a high frequency (e.g., fifteen documents per hour). An "Idle" user state can be defined as the user not having accessed any document for a prolonged period of time (e.g., no document access for thirty minutes).

For another example, an outcome of a user interaction with the device can be used to define a user state. For example, failed internet access can be used as a trigger event for a "Disappointed" user state. For another example, winning a game or successfully completing a stage in the game can be used as trigger events for a "Victorious" user state, and associated with an avatar instance showing excited expressions and jumping up and down.

The user's device can be used to monitor the interaction speed, frequency, and/or outcome, and the occurrence of the user state can be detected based on a determination that user input is being received from the user in the manner that defines the user state. In some implementations, the avatar server receives the monitoring information from the user client device associated with the user, and determines whether the manner of user interaction on the device matches any user state defined for the user.

In some implementations, the user state can be defined by a photograph of the user showing a particular emotion. For example, the user can upload a photograph showing a big smile to the avatar server, and use the photograph as a trigger event for a "Happy" user state. Subsequently, when a camera on the user device captures a digital image of the user in real-time and the captured image shows the user having the same facial expression as that shown in the uploaded photograph, the avatar server can determine that the "Happy" user state has occurred.

In some implementations, the user state can be defined by a state of the device that the user is using. The state of the device can include, for example, a type of the device, a power level of the device, a bandwidth of the device, and so on.

For example, the user can define an "Annoyed" user state having a trigger event based on an undesirable device state. For example, the "Annoyed" user state can be associated with a battery level below twenty percent, and/or a network bandwidth below a threshold value. An avatar instance showing a frustrated, concerned, and/or annoyed expression can be associated with the "Annoyed" user state defined by the device state. The device state can be monitored by the avatar server and the occurrence of the user state can be based on a match between a current state of the device and the device state that defines the user state.

In some implementations, the same user state can be defined by different types of trigger events described above. For example, the "Happy" user state can be associated with trigger events based on textual strings, time, a manner of interaction, a device state, and/or the combinations of one or more of the above. In addition, other types of trigger events can be used to define user states, such as, current location, weather, news, popularity of the user's blog, ratings that the user has given out on discussion forums, etc.

Figure 6A:
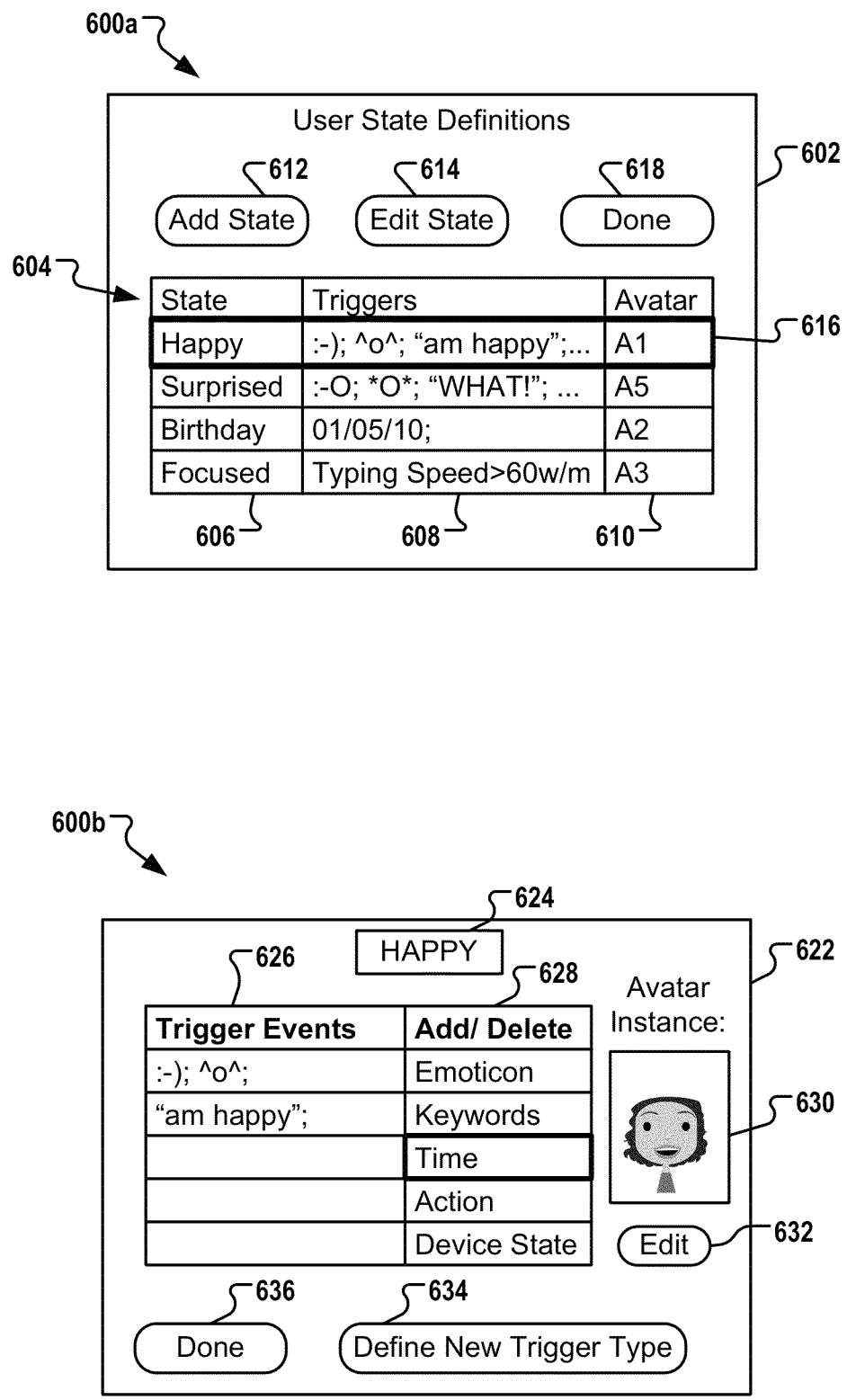
FIGS. 6A-6B are exemplary user interfaces for defining a user state and creating an avatar instance for the user state.
Figure 6B:
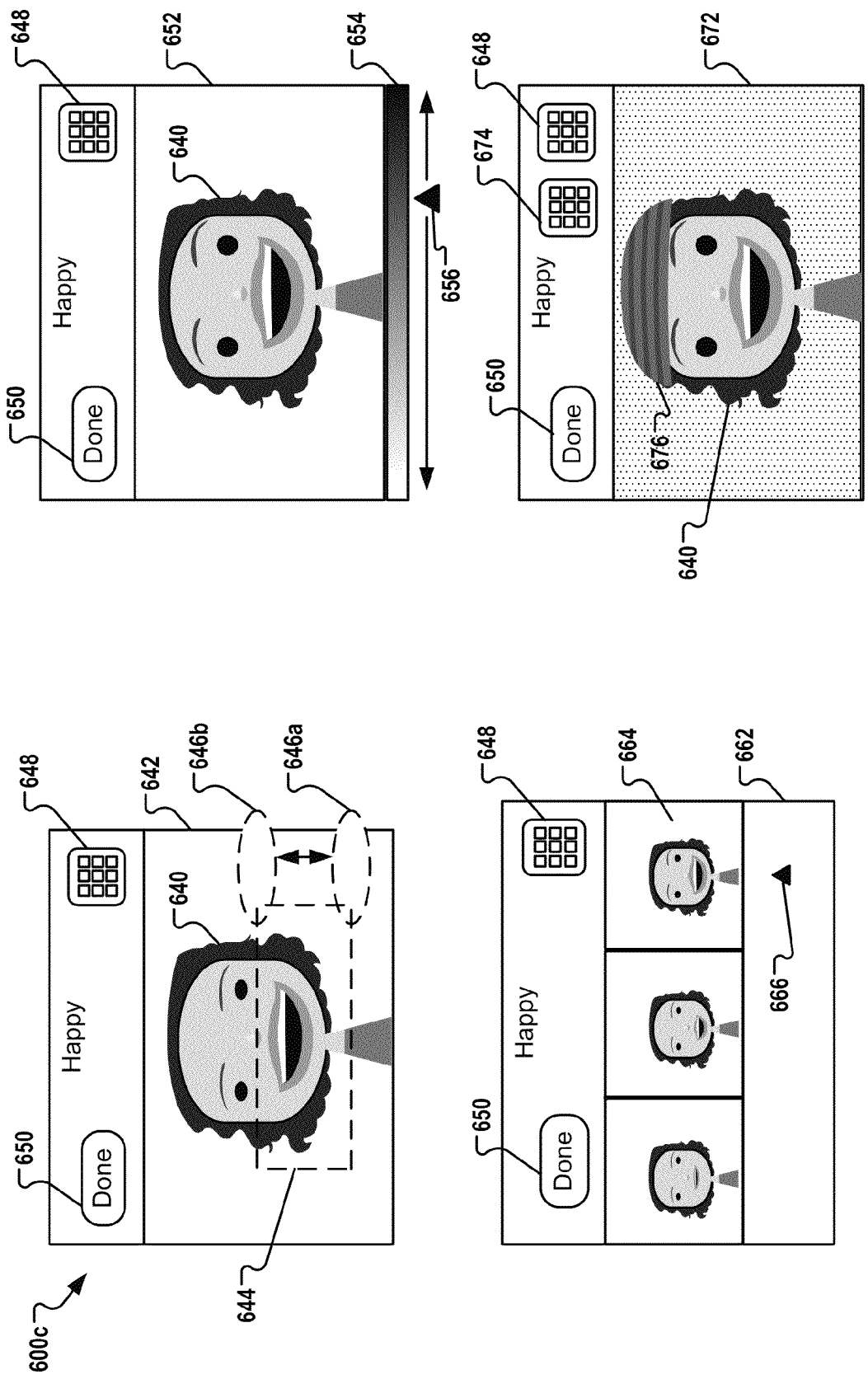

FIGS. 6A-6B are exemplary user interfaces 600 for defining a user state and creating a customized avatar instance for the user state. The exemplary user interfaces 600 can be provided by the avatar server 102 in an avatar editing environment. Each user can identify him or herself to the avatar server, and the user can then be provided with the user interface 600 for editing the user's own user state definitions and avatar definitions.

In FIG. 6A, example interfaces for defining and modifying a user state are presented. In user interface 602, a table 604 of existing user states is presented. Each user state in the table is defined by a name as shown in column 606. Each user state is also defined by one or more trigger events used to detect presence of the user state, as shown in column 608. In some implementations, the trigger events can be presented in groups of different trigger types (e.g., emoticon, keywords, time, action, device state, etc.). Each user is further associated with an avatar instance that is used to represent the emotional response of the user when the user state is present. The avatar instance associated with each user state referenced in the definition of the user state, as shown in column 610.

In the example user interface 602, there are a few existing user states already defined for the user. For example, the "Happy" user state is defined by a few emoticons ":-)" and "^o^", and a key phrase "am happy." The "Happy" user state also references a customized avatar instance "A1" that has been previously created. The definition of the customized avatar instance "A1" can be stored with other customized instances of the user's individualized avatar in the avatar definition database 108. In some implementations, a thumbnail of the avatar instance can be presented in the table for each user state. For another example, the "Birthday" user state is defined by a date (e.g., the user's birthday, or the birthday of a friend of the user). The "Birthday" user state references another customized avatar instance "A2" that has been previously created.

In the example user interface 602, the user can select and edit an existing user state by first selecting the user state in the table 604 and then selecting user interface element 614 (e.g., an "Edit State" button). When the user selects the user interface element 614, the user state editing interface 622 can be presented, showing the current definition of the selected user state.

In the example user interface 602, the user can also create a new user state by selecting user interface element 612 (e.g., the "Add State" button). When the user selects the user interface element 612, the user state editing interface 622 can be presented, allowing the user to specify the necessary definition data for the new user state.

Once the user is satisfied with the current user state definitions, the user can select user interface element 618 (e.g., a "Done" button) to exit the user state definition interface 602. The updated user state definitions can be stored in the user state definition database 107 for the user.

In this example, suppose the user has selected an existing user state "Happy" and selected the "Edit State" button, a user state editing interface 622 can be presented. In the user state editing interface 622, various aspects of the user state definition can be customized. For example, the user can edit the name or identifier of the user state in field 624. The user can select and type in a new name for the selected user state "Happy," such as "Smile."

In the user state editing interface 622, the existing trigger events for the user state is presented, e.g., in column 626. The trigger events can be grouped based their trigger event types. For example, all emoticons are grouped together; all keywords are grouped together, and so on. The user state editing interface 622 can also present respective user interface elements 628 for adding and deleting trigger events of each type to the definition of the selected user state. For example, the user state editing interface 622 can include respective buttons to add or delete emoticons, keywords, time/date, actions, device states, and so on as trigger events for the selected user state. Once the add/delete trigger event buttons are selected, a new interface can be presented for the user to specify the exact trigger events that is to be added or deleted.

In some implementations, the user state editing interface 622 can also include user interface element 634 for defining new trigger event types. For example, a user can select and specify combinations of different types of existing trigger event types as a new trigger event type, such that only simultaneous occurrence of the specified trigger events indicate the presence of the user state.

In some implementations, the user can also specify completely new trigger event types. For example, the user can specify a trigger event type of "email alert," and specify names of other users from whom emails may be received. For example, the user may specify a favorite friend's name, and make it a trigger event for "Happy" user state. Whenever an email is received from this favorite friend, the avatar instance associated with the "Happy" user state can be presented on the user's device to represent the current emotional state of the user. The same avatar instance can be presented on other user's devices (e.g., the device of the favorite friend) to represent the current emotional state of the user.

Many other types of trigger events can be defined. The type of trigger events is only limited by the user's creativity and imagination. In some implementations, the avatar server 102 can present a sharing button on the user state definition interface 602 that allows the user to share a selected user state that the user has defined. In some implementations, the avatar server 102 can provide a sale and exchange environment for multiple users to share and exchange their own user state definitions.

In some implementations, the user can specify a group of close friends with whom newly defined user states are automatically shared. The original avatar instance in the shared user state definition can be replaced with a new avatar instance associated with the user receiving the shared user state. In some implementations, the avatar server 102 can generate the new avatar instance based on the receiving user's avatar and the characteristics of the original avatar instance associated with the shared user state.

In some implementations, the user state editing interface 622 can include a display of the customized avatar instance 630 associated with the user state. The user can edit the customized avatar instance 630 by selecting user interface element 632 (e.g., an "Edit" button). In some implementations, if the user state is still in the process of being defined, the user's default avatar can be presented in the display. The user can select the "Edit" button to customize the user's default avatar and customize the expression, body language, and presentation theme associated with the avatar instance.

Once the user is done with specifying the definition of the user state, the user can exist the user state editing interface 622 by selecting user interface element 636 (e.g., a "Done" button). The user state definition 602 can be presented showing the newly edited or created user state along with the other existing user states in the table 604.

FIG. 6B shows some example user interfaces 600c for creating a customized avatar instance for a selected user state. One or more of the user interfaces 600c can be presented after the user has selected the user interface element 632 for editing or creating the customized avatar instance for the selected user state.

In some implementations, an avatar editing interface 642 can be presented. The user interface 642 can include an initial avatar instance 640. The initial avatar instance can be the default individualized avatar of the user if a new user state is being defined. The initial avatar instance can be the current customized avatar instance associated with the user state that is being edited.

In some implementations, the user can select a facial feature of the avatar on the user interface, for example, by a point device. The selected facial feature 646 can be highlighted. The user can proceed to change the location, shape, and size of the selected facial feature by moving the selected facial feature, or resize it as a whole or in a particular portion. In some implementations, the device can have a touch-sensitive display, and the user can select the facial feature by touching a desired portion on the display. In this example, the user has selected the mouth portion of the avatar's face, and the user can expand the mouth in the vertical direction by increasing the two touch points 646a and 646b on the touch-sensitive display. Other means of changing the shape, location, and size of the selected feature can be provided.

In some implementations, the avatar editing interface 642 can include a element picker 648 for adding or modifying an element of the avatar instance. When selected, element selector can be presented, allowing the user to select a particular element (e.g., face, skin tone, eyes, nose, hair, shirt, hat, background, etc.) of the avatar instance to edit the element in detail.

In some implementations, an avatar editing interface 652 can be presented. The user interface 652 can include an initial avatar instance 640. The avatar editing interface 652 also includes a user interface element for specifying an intensity level associated with the avatar instance shown on the interface 652. The initial avatar instance 640 can have an initial facial expression that is of medium intensity and reflective of the emotional state an average person under the selected user state.

In some implementations, the user interface element for adjusting the intensity level can be a slider 654. The user can move an indicator 656 on the slider from one side to the other side, and change the intensity level of the emotional shown on the avatar instance. For example, when the user moves the indicator 656 toward the right extreme of the slider 654, the emotion on the avatar face becomes more exaggerated (e.g., with enlarged eyes, raised brows, and wide open mouth). In contrast, when the user moves the indicator 656 toward the left extreme of the slider 654, the motion on the avatar face becomes more subdued. The user can move the indicator 656 to a point on the slider 654 such that the avatar 640 shows the expression with the correct intensity level that the user wishes to use to express his or her own emotional response for the user state.

In some implementations, an avatar editing interface 662 can be presented. The avatar editing interface 662 can show a number of suggested avatar instances 664 for the user state. Each suggested avatar instance can show an expression that is likely to express the user's emotional response associated with the user state. The user can select (e.g., through the selector 666) the suggested avatar instance that has a facial expression that most closely resemble the expression the user wishes to use for the user state. The selected avatar instance can be used as the customized avatar instance for the user state being edited or created.

In some implementations, an avatar editing interface 672 can be presented. The avatar editing interface 672 can include element pickers 674 and 648 for adding and modifying the accessories, clothing items, and presentation themes associated with an avatar instance. For example, the user can select the element picker 648 to invoke the element picker interface. Through the element picker interface, the user can select the hat element, and change the hat shown on the avatar instance. For example, for the "Birthday" user state, the user can select a party hat to put on the avatar instance.

In some implementations, the user can select the theme picker 647 to change the presentation theme associated with the avatar instance. The user can select various theme element, such as background image, background sound effect, and animation effects from the theme picker interface. For example, for the "Birthday" user state, the user can select a happy birthday song as the sound effect to be played whenever the avatar instance is displayed.

Other user interfaces for creating a customized avatar instance can be implemented. Multiple customization techniques can be implemented in the same interface.

Figure 7:
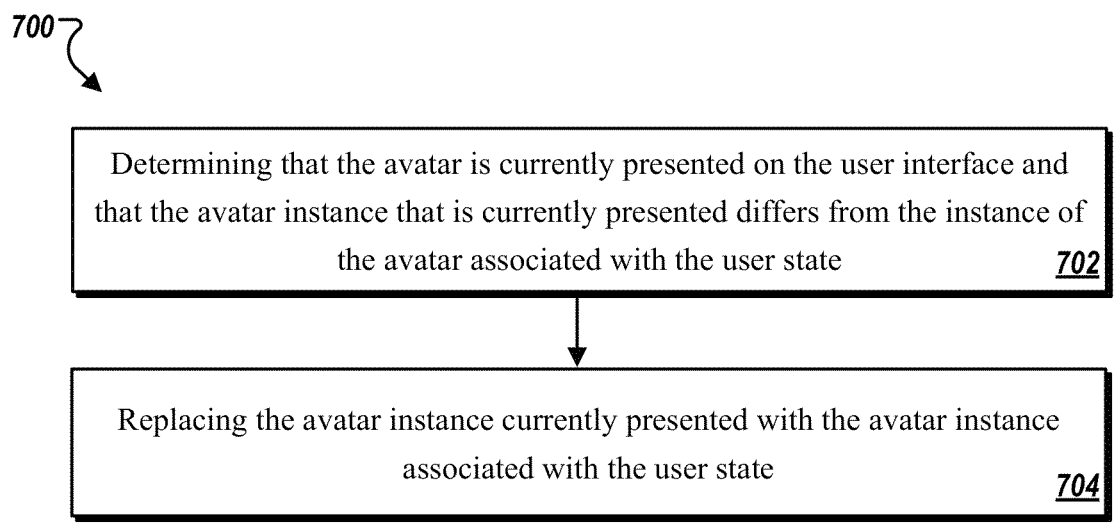
FIG. 7 is a flow diagram of an exemplary process for updating an avatar instance presented on a user interface based on a current user state detected on a user device.

FIG. 7 is a flow diagram of an example process 700 for updating the current avatar presented in a user interface based on a current user state. The process 700 includes determining that the user's avatar is currently presented on a user interface and that the avatar instance that is currently presented differs from the avatar instance associated with the current user state (702). Then, the avatar instance currently presented is replaced with the avatar instance associated with the user state (704). In some implementations, intermediate instances of the avatar are presented on the user interface to show a smooth transition from the current avatar instance to the updated avatar instance. In some implementations, the intermediate instances of the avatar are generated by the avatar server based on an interpolation between the avatar instance currently displayed and the avatar instance that reflects the current user state.

In some implementations, the transition from the current avatar instance to the updated avatar instance occurs at a speed that is dependent on the current user state. For example, if the newly detected user state is a "Calm" user state, then the transition is at a lower speed than if the newly detected user state is a "Surprised" user state.

In addition, the speed of the transition can also be dependent on the direction of the transition. For example, a transition from a "neutral" avatar instance to a "laughing" avatar instance is faster than a transition from a "laughing" avatar instance to the "neutral" avatar instance. The speed of transition can be determined by the avatar server based on heuristics known about how people change their expressions. In some implementations, the avatar server can provide an interface for the user to decide how fast or slow the transition should be from one avatar instance to another avatar instance.

FIG. 8 is a flow diagram of another example process 800 for using customized avatar expressions to reflect user-defined user states. The process 800 starts when first user input defining a user state by one or more trigger events is received (802). Then, second user input specifying a customized avatar instance to represent the user state is received (804), where the customized avatar instance showing a user-defined facial expression on an individualized avatar associated with the user. The customized avatar instance is associated with the user-defined user state (806). Subsequently, occurrence of the one or more trigger events is detected on a device (808). After the detection of the trigger events, the individualized avatar presented on a user interface of the device is updated with the customized avatar instance associated with the user state (810).

Exemplary Software Architecture

Figure 9:
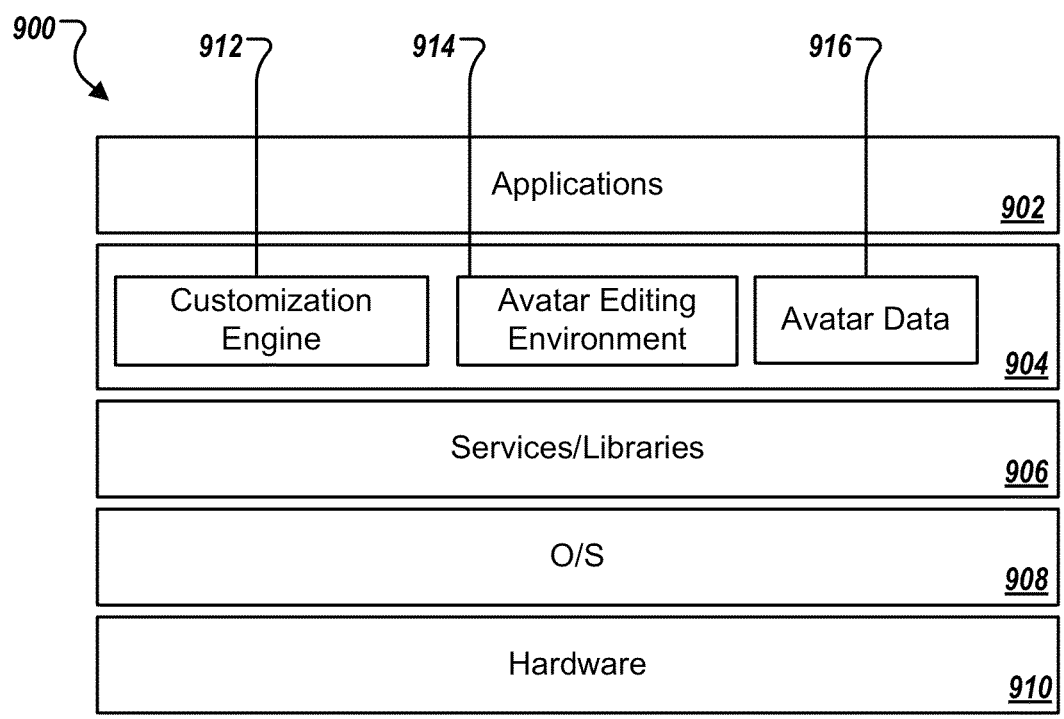
FIG. 9 is exemplary software architecture for implementing the avatar customization and updating processes described in reference to FIGS. 1-8.

FIG. 9 is an exemplary software architecture for implementing the methods for using customized avatar instances to reflect user states as described in reference to FIGS. 1-7. In some implementations, the avatar editing environment for specifying an individualized basic avatar, user state definitions, and the avatar instances associated with each user state can be part of a framework in a software architecture or stack. An exemplary software stack 900 can include an applications layer 902, framework layer 904, services layer 906, OS layer 908 and hardware layer 910. Applications (e.g., email, text messaging, and games) can incorporate the avatar editing environment using an API. Framework layer 904 can include customization engine 912 and avatar editing environment 914. The Framework layer 904 also includes avatar data 916. The customization engine 912 can make API calls to graphics services or libraries in services layer 906 or OS layer 908 to perform all or some of its tasks described in reference to FIGS. 1-8, such as detecting trigger events and updating avatar instances based on the trigger events. Avatar editing environment 914 can provide the user interfaces for selection and creation of user states and avatar instances described in reference to FIGS. 1-8. Avatar editing environment 914 can make API calls to services or libraries in services layer 906 or OS layer 908 to perform all or some of its tasks.

Services layer 906 can provide various graphics, animations and UI services to support customization engine 912, avatar editing environment 914 and applications (e.g., games) in applications layer 902. In some implementations, services layer 906 includes touch model for interpreting and mapping raw touch data from a touch sensitive device to touch events (e.g., gestures, rotations), which can be accessed by applications and by avatar editing environment 914 using call conventions defined in a touch model API. Services layer 906 can also include communications software stacks for wireless communications.

OS layer 908 can be a complete operating system (e.g., MAC OS) or a kernel (e.g., UNIX kernel). Hardware layer 910 includes hardware necessary to perform the tasks described in reference to FIGS. 1-7, including but not limited to: processors or processing cores (including application and communication baseband processors), dedicated signal/image processors, ASICs, graphics processors (e.g., GNUs), memory and storage devices, communication ports and devices, peripherals, etc.

Software stack 900 can be included on a mobile device capable of executing software applications. An API specification describing call conventions for accessing API functions can be used by application developers to incorporate avatar editing and color customization permissions in applications.

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

Exemplary Mobile Device Architecture

Figure 10:
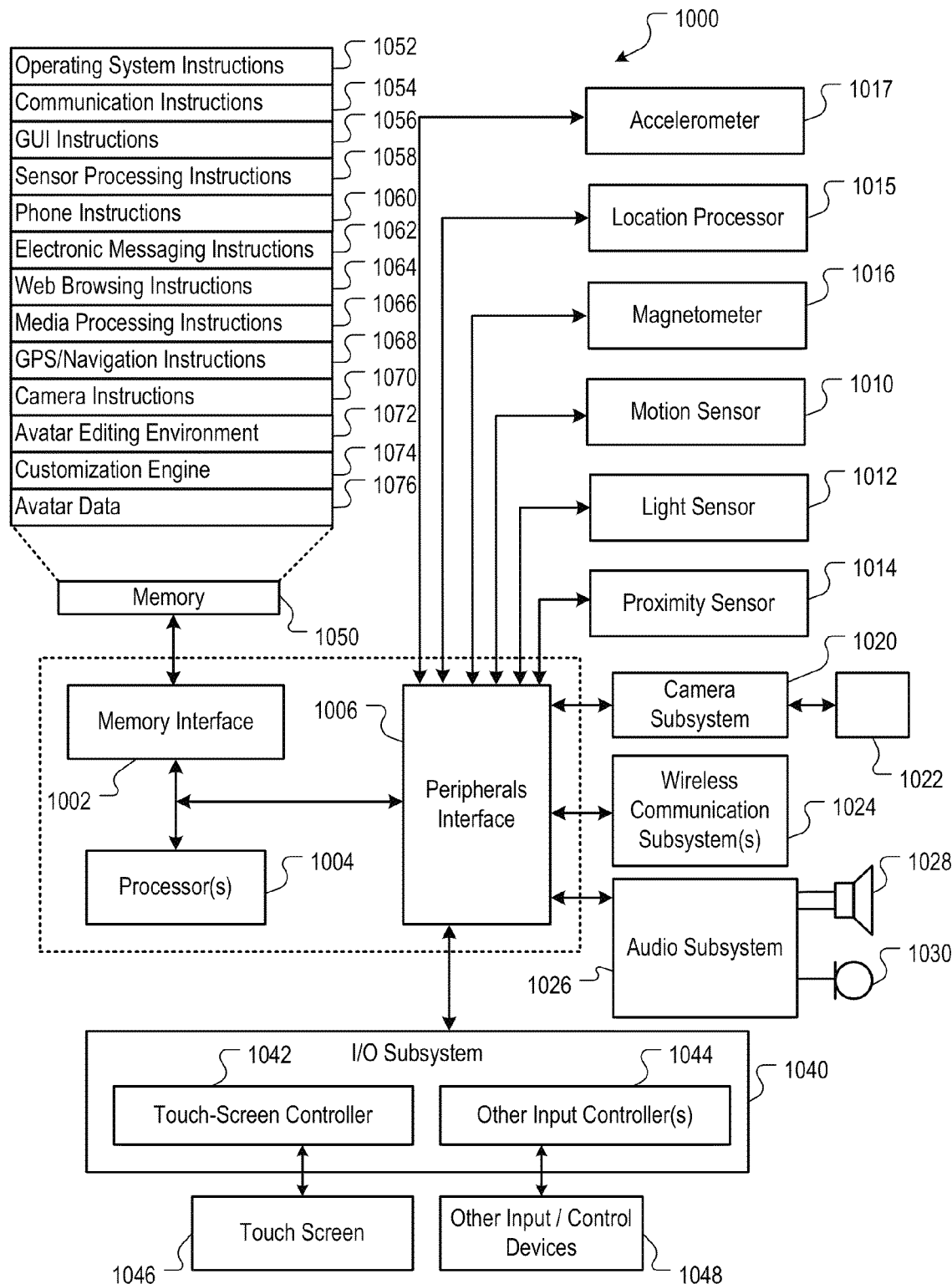
FIG. 10 is a block diagram of exemplary hardware architecture for implementing the avatar customization and updating processes described in reference to FIGS. 1-9.

FIG. 10 is a block diagram of an exemplary hardware architecture 1000 for a device implementing the avatar editing environment and customization based on user states described in reference to FIGS. 1-9. The device can include memory interface 1002, one or more data processors, image processors and/or processors 1004, and peripherals interface 1006. Memory interface 1002, one or more processors 1004 and/or peripherals interface 1006 can be separate components or can be integrated in one or more integrated circuits. The various components in the device, for example, can be coupled by one or more communication buses or signal lines.

Sensors, devices, and subsystems can be coupled to peripherals interface 1006 to facilitate multiple functionalities. For example, motion sensor 1010, light sensor 1012, and proximity sensor 1014 can be coupled to peripherals interface 1006 to facilitate orientation, lighting, and proximity functions of the mobile device. Location processor 1015 (e.g., GPS receiver) can be connected to peripherals interface 1006 to provide geopositioning. Electronic magnetometer 1016 (e.g., an integrated circuit chip) can also be connected to peripherals interface 1006 to provide data that can be used to determine the direction of magnetic North. Thus, electronic magnetometer 1016 can be used as an electronic compass. Accelerometer 1017 can also be connected to peripherals interface 1006 to provide data that can be used to determine change of speed and direction of movement of the mobile device.

Camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1024, which can include radio frequency receivers and transmitters and/or optical (e.g., infrared) receivers and transmitters. The specific design and implementation of the communication subsystem 1024 can depend on the communication network(s) over which a mobile device is intended to operate. For example, a mobile device can include communication subsystems 1024 designed to operate over a GSM network, a GPRS network, an EDGE network, a Wi-Fi or WiMax network, and a Bluetooth network. In particular, the wireless communication subsystems 1024 can include hosting protocols such that the mobile device can be configured as a base station for other wireless devices.

Audio subsystem 1026 can be coupled to a speaker 1028 and a microphone 1030 to facilitate voice-enabled functions, such as voice recognition, voice replication, digital recording, and telephony functions.

I/O subsystem 1040 can include touch screen controller 1042 and/or other input controller(s) 1044. Touch-screen controller 1042 can be coupled to a touch screen 1046 or pad. Touch screen 1046 and touch screen controller 1042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 1046.

Other input controller(s) 1044 can be coupled to other input/control devices 1048, such as one or more buttons, rocker switches, thumb-wheel, infrared port, USB port, and/or a pointer device such as a stylus. The one or more buttons (not shown) can include an up/down button for volume control of speaker 1028 and/or microphone 1030.

In one implementation, a pressing of the button for a first duration may disengage a lock of the touch screen 1046; and a pressing of the button for a second duration that is longer than the first duration may turn power to the device on or off. The user may be able to customize a functionality of one or more of the buttons. The touch screen 1046 can, for example, also be used to implement virtual or soft buttons and/or a keyboard.

In some implementations, the device can present recorded audio and/or video files, such as MP3, AAC, and MPEG files. In some implementations, the device can include the functionality of an MP3 player, such as an iPod™. The device may, therefore, include a pin connector that is compatible with the iPod. Other input/output and control devices can also be used.

Memory interface 1002 can be coupled to memory 1050. Memory 1050 can include high-speed random access memory and/or non-volatile memory, such as one or more magnetic disk storage devices, one or more optical storage devices, and/or flash memory (e.g., NAND, NOR). Memory 1050 can store operating system 1052, such as Darwin, RTXC, LINUX, UNIX, OS X, WINDOWS, or an embedded operating system such as VxWorks. Operating system 1052 may include instructions for handling basic system services and for performing hardware dependent tasks. In some implementations, operating system 1052 can include a kernel (e.g., UNIX kernel).

Memory 1050 may also store communication instructions 1054 to facilitate communicating with one or more additional devices, one or more computers and/or one or more servers. Memory 1050 may include graphical user interface instructions 1056 to facilitate graphic user interface processing; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GPS/Navigation instructions 1068 to facilitate GPS and navigation-related processes and instructions; and camera instructions 1070 to facilitate camera-related processes and functions. The memory 1050 may also store other software instructions (not shown), such as security instructions, web video instructions to facilitate web video-related processes and functions, and/or web-shopping instructions to facilitate web shopping-related processes and functions. In some implementations, the media processing instructions 1066 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 1050.

Memory 1050 can include instructions for avatar editing environment 1072 and avatar animation engine 1074. Memory 1050 can be a local cache for avatar data 1076 that results from the avatar editing process.

Each of the above identified instructions and applications can correspond to a set of instructions for performing one or more functions described above. These instructions need not be implemented as separate software programs, procedures, or modules. Memory 1050 can include additional instructions or fewer instructions. Furthermore, various functions of the mobile device may be implemented in hardware and/or in software, including in one or more signal processing and/or application specific integrated circuits.

Exemplary Operating Environment

Figure 11:
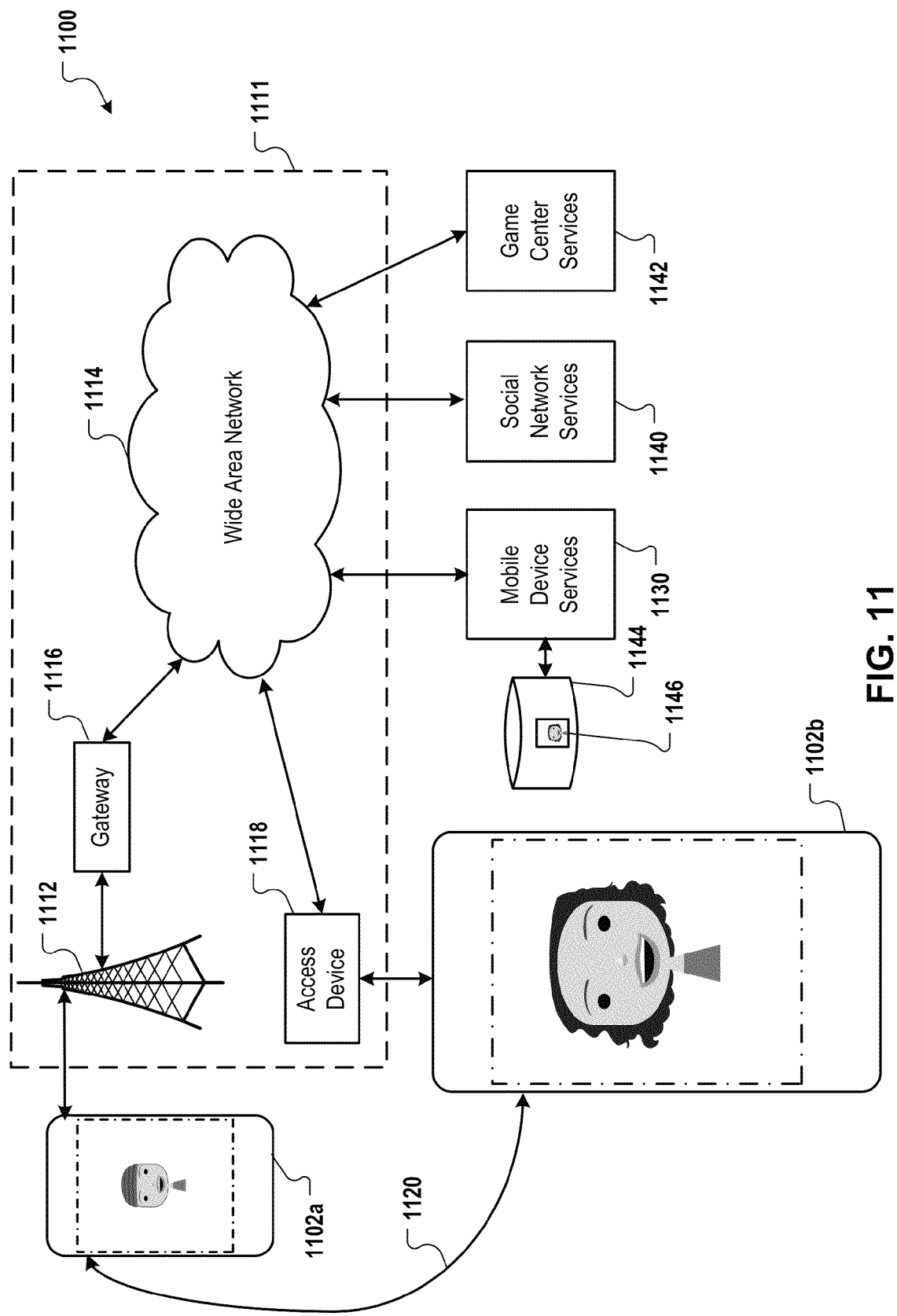
FIG. 11 is a block diagram of exemplary network operating environment for a device employing the avatar customization and updating processes described in reference to FIGS. 1-10.

FIG. 11 is a block diagram of an exemplary network operating environment 1100 for a device employing the avatar editing environment and animation described in reference to FIGS. 1-8. In this example, devices 1102a and 1102b can, for example, communicate over one or more wired and/or wireless networks 1110 in data communication. For example, a wireless network 1112, e.g., a cellular network, can communicate with a wide area network (WAN) 1114, such as the Internet, by use of a gateway 1116. Likewise, an access device 1118, such as an 802.11g wireless access device, can provide communication access to the wide area network 1114. Although this example illustrates an operating environment for mobile devices, the operating environment can also be applied to a device that is wired to a network (e.g., a desktop computer).

In some implementations, both voice and data communications can be established over wireless network 1112 and the access device 1118. For example, mobile device 1102a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1112, gateway 1116, and wide area network 1114 (e.g., using Transmission Control Protocol/Internet Protocol (TCP/IP) or User Datagram Protocol (UDP)). Likewise, in some implementations, the mobile device 1102b can place and receive phone calls, send and receive e-mail messages, and retrieve electronic documents over the access device 1118 and the wide area network 1114. In some implementations, device 1102a or 1102b can be physically connected to the access device 1118 using one or more cables and the access device 1118 can be a personal computer. In this configuration, device 1102a or 1102b can be referred to as a "tethered" device.

Devices 1102a and 1102b can also establish communications by other means. For example, wireless device 1102a can communicate with other wireless devices, e.g., other devices 1102a or 1102b, cell phones, etc., over the wireless network 1112. Likewise, devices 1102a and 1102b can establish peer-to-peer communications 1120, e.g., a personal area network, by use of one or more communication subsystems, such as the Bluetooth™ communication devices. Other communication protocols and topologies can also be implemented.

Device 1102a or 1102b can communicate with a variety of services over the one or more wired and/or wireless networks. In some implementations, services can include mobile device services 1130, social network services 1140, and game center services 1142.

Mobile device services 1130 can provide a variety of services for device 1102a or 1102b, including but not limited to mail services, text messaging, chat sessions, videoconferencing, Internet services, location based services (e.g., map services), sync services, remote storage 1144, downloading services, etc. Remote storage 1146 can be used to store avatar data, which can be used on multiple devices of the user or shared by multiple users. In some implementations, an avatar editing environment can be provided by one or more of the services 1130, 1140, 1142, which can be accessed by a user of device 1102a or 1102b through, for example, web pages served by one or more servers operated by the services 1130, 1140, 1142.

In some implementations, social networking services 1140 can provide a social networking website, where a user of device 1102a or 1102b can set up a personal network and invite friends to contribute and share content, including avatars and avatar related items. A user can use their custom avatar made with an avatar editing environment in place of a digital photo to protect their privacy.

In some implementations, game center services 1142 can provide an online gaming environment, where users of device 1102a or 1102b can participate in online interactive games with their avatars created using the avatar editing environment described in reference to FIGS. 1-7. In some implementations, avatars and/or elements created by an avatar editing environment can be shared among users or sold to players of online games. For example, an avatar store can be provided by game center services 1142 for users to buy or exchange avatars and avatar related items (e.g., clothes, accessories).

Device 1102a or 1102b can also access other data and content over the one or more wired and/or wireless networks. For example, content publishers, such as news sites, Rally Simple Syndication (RSS) feeds, web sites, blogs, social networking sites, developer networks, etc., can be accessed by device 1102a or 1102b. Such access can be provided by invocation of a web browsing function or application (e.g., a browser) in response to a user touching, for example, a Web object.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method performed by one or more data processing apparatuses, the method comprising:
   presenting a default avatar instance having a facial expression associated with a user state, the default avatar instance based, at least in part, on a composite of previously customized avatar instances associated with the user state;
   receiving a first input selecting the default avatar instance;
   receiving a second input customizing the facial expression of the default avatar instance to generate a customized avatar instance;
   associating the customized avatar instance with the user state;
   detecting an occurrence of one or more trigger events on a device indicating a presence of the user state; and
   updating, based on the detecting, a current avatar instance with the customized avatar instance.

2. The method of claim 1, further comprising:
   receiving a third input to a facial feature of the default avatar instance, the third input adjusting at least one of a location, shape, or size of the facial feature; and
   generating the customized avatar instance based at least on the adjusted facial feature.

3. The method of claim 1, further comprising:
   receiving a third input to the facial expression of the default avatar instance, the third input adjusting an emotional intensity level associated with the facial expression; and
   generating the customized avatar instance based on the facial expression having the adjusted emotional intensity level.

4. The method of claim 1, further comprising:
   creating and storing a user state definition for the user state based on the act of associating, the user state definition specifying the one or more trigger events and referencing the customized avatar instance.

5. The method of claim 1, wherein the second input further adjusts at least one of accessories and clothing items on the default avatar instance.

6. The method of claim 1, wherein the second input further adjusts a presentation scheme for the default avatar instance, the presentation scheme including at least one of a background image, a background sound effect, or an animation effect accompanying the presentation of the customized avatar instance in a user interface.

7. The method of claim 1, wherein the user state is user-defined, and wherein the second input further specifies the one or more trigger events.

8. The method of claim 1,
   wherein the user state is defined by a textual string, the textual string being one of a word, a phrase, an emoticon, a punctuation, or a text format that conveys an emotional connotation associated with the user state, and
   wherein detecting the occurrence of the one or more trigger events on the device further comprises detecting occurrences of the textual string in a textual message sent from the device.

9. The method of claim 1,
   wherein the user state is defined by a predetermined time associated with a special occasion, and
   wherein detecting the occurrence of the one or more trigger events on the device further comprises detecting arrival of the predetermined time on the device.

10. The method of claim 1,
    wherein the user state is defined by a manner in which a user is interacting with the device, the manner of interaction including at least one of a speed, frequency, and outcome of the interaction, and
    wherein detecting the occurrence of the one or more trigger events on the device further comprises detecting that inputs are being received from the user in the manner that defines the user state.

11. The method of claim 1,
    wherein the user state is defined by a state of the device, the state of the device includes at least one of a type of the device, a power level of the device, and a bandwidth of the device, and
    wherein detecting the occurrence of the one or more trigger events on the device further comprises detecting a match between a current state of the device and the device state that defines the user state.

12. The method of claim 1, wherein updating the current avatar instance further comprises:
    determining that the current avatar instance is presented on a user interface of the device and differs from the customized avatar instance; and
    replacing the current avatar instance with the customized avatar instance.

13. The method of claim 12, wherein replacing the current avatar instance further comprises:
    providing intermediate avatar instances on the device's user interface to show a smooth transition from the current avatar instance to the customized avatar instance.

14. The method of claim 13, wherein the transition from the current avatar instance to the customized avatar instance occurs at a speed that is dependent on the user state.

15. A computer-implemented method performed by one or more data processing apparatuses, the method comprising:
    presenting a default avatar instance, the default avatar instance having a facial expression associated with a user state, the default avatar instance based, at least in part, on a composite of previously customized avatar instances associated with the user state;
receiving a first input selecting the default avatar instance;
receiving a second input customizing the facial expression of the default avatar instance to generate a customized avatar instance;
associating the customized avatar instance with the user state;
receiving a third input associating the user state with one or more trigger events;
associating the customized avatar instance with the user state;
detecting an occurrence of the one or more trigger events on a device; and
updating, based on the detecting, a current avatar instance with the customized avatar instance.

16. A non-transitory computer-readable medium having instructions stored thereon, which, when executed by one or more processors, cause the processors to:
present a default avatar instance, the default avatar instance having a facial expression associated with a user state, the default avatar instance based, at least in part, on a composite of previously customized avatar instances associated with the user state;
receive a first input selecting the default avatar instance;
receive a second input associating the user state with one or more trigger events;
associate the default avatar instance with the user state;
detect an occurrence of the one or more trigger events on a device; and
update, based on the detecting, a current avatar instance with the default avatar instance.

17. A system, comprising:
one or more processors; and
memory coupled to the one or more processors and storing instructions, the instructions, when executed by the one or more processors, cause the one or more processors to perform operations comprising;
presenting a default avatar instance, the default avatar instance having a facial expression associated with a user state, the default avatar instance based, at least in part, on a composite of previously customized avatar instances associated with the user state;
receiving a first input selecting the default avatar instance;
receiving a second input associating the user state with one or more trigger events;
associating the default avatar instance with the user state;
detecting an occurrence of the one or more trigger events on a device; and
updating, based on the detecting, a current avatar instance with the default avatar instance.

18. A non-transitory computer-readable medium having instructions stored thereon, which, when executed by one or more processors, cause the processors to:
present a default avatar instance, the default avatar instance having a facial expression associated with a user state, the default avatar instance based, at least in part, on a composite of previously customized avatar instances associated with the user state;
receive first input selecting the default avatar instance;
receive a second input customizing the facial expression of the default avatar instance to generate a customized avatar instance;
associate the customized avatar instance with the user state;
detect an occurrence of one or more trigger events on a device, the one or more trigger events indicating a presence of the user state; and
update, based on the detecting, a current avatar instance with the customized avatar instance.

* * * * *

UNITED STATES PATENT AND TRADEMARK OFFICE
CERTIFICATE OF CORRECTION

PATENT NO.         : 8,694,899 B2
APPLICATION NO.    : 12/791643
DATED              : April 8, 2014
INVENTOR(S)        : Thomas Goossens et al.

Page 1 of 1

It is certified that error appears in the above-identified patent and that said Letters Patent is hereby corrected as shown below:

In the Claims:

Column 24, line 28 (Claim 9, line 5), insert the word --an-- before the word "arrival".

Column 24, line 41 (Claim 11, line 3), replace "includes" with --including--.

Column 26, line 2 (Claim 17, line 6), replace ";" with --:--.

Column 26, line 24 (Claim 18, line 9), insert the word --a-- before the word "first".

Signed and Sealed this
Tenth Day of June, 2014

Michelle K. Lee
*Deputy Director of the United States Patent and Trademark Office*